No. 897,630.  
R. KRONENBERG.  
DETACHABLE RIM.  
APPLICATION FILED DEC. 21, 1907.

PATENTED SEPT. 1, 1908.

2 SHEETS—SHEET 1.

Witnesses:

Inventor  
Rudolf Kronenberg  
per Attorney.

UNITED STATES PATENT OFFICE.

RUDOLF KRONENBERG, OF OHLIGS, GERMANY.

DETACHABLE RIM.

No. 897,630.   Specification of Letters Patent.   Patented Sept. 1, 1908.

Application filed December 21, 1907. Serial No. 407,462.

*To all whom it may concern:*

Be it known that I, RUDOLF KRONENBERG, a subject of the King of Prussia, German Emperor, residing at Ohligs-on-the-Rhine, in the Province of the Rhine, Kingdom of Prussia, German Empire, have invented a certain new and useful Detachable Rim, of which the following is a specification.

This invention relates to a rim for pneumatic tires removable from the body of the wheel.

According to this invention there are arranged upon the ends of the spokes supporting blocks which serve to support eccentrically-shaped and revoluble rollers. These rollers are provided with sloping surfaces so that after they have revolved 180° a distention of the pneumatic tube rim is effected in a convenient manner. There should therefore be in the working condition a firm connection of the rim with the body of the wheel.

Figure 1:
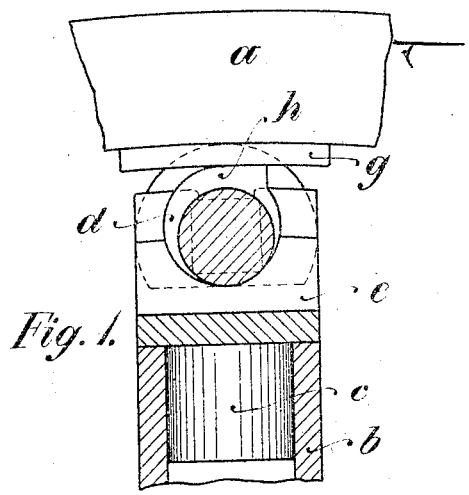
Figure 2:
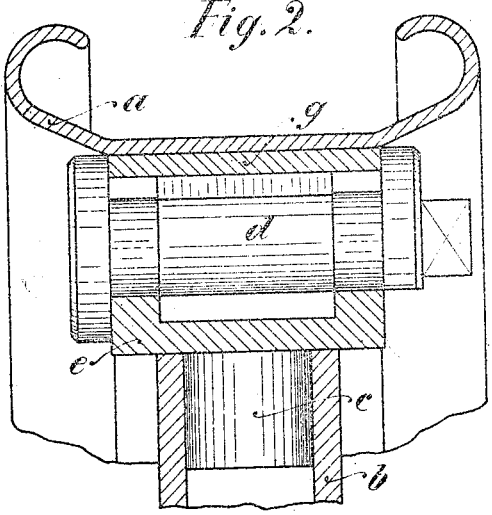
Figure 3:
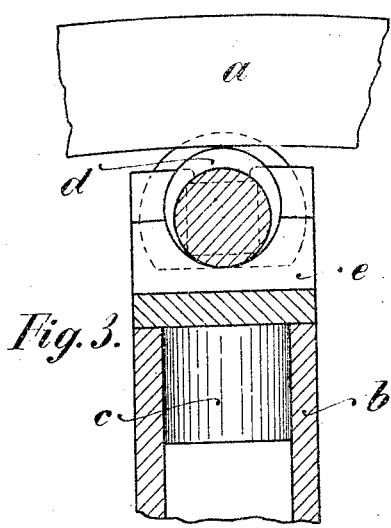
Figure 4:
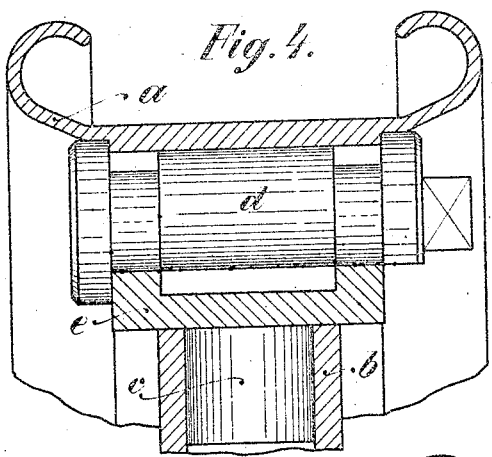
Figure 5:
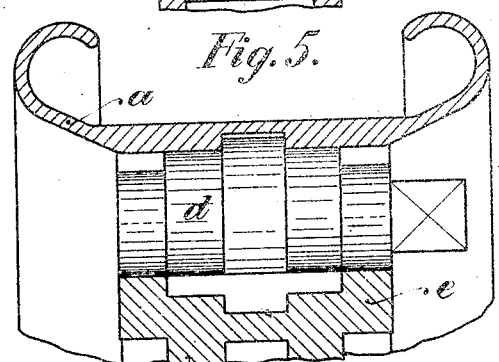
Figure 6:
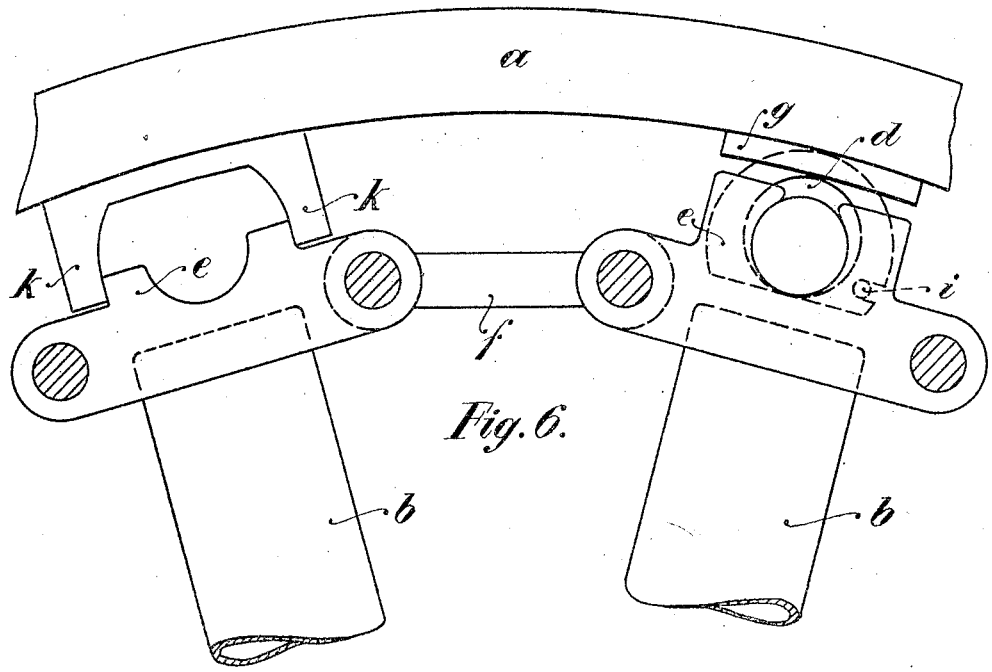
Figure 7:
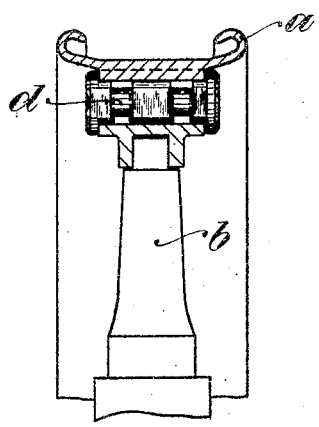

In the drawing there are illustrated in Figures 1 to 8 various constructional forms of the removable rim. Fig. 1 shows the rim in elevation and the spoke and the other parts in section. Fig. 2 shows the same parts at right angles thereto *i. e.* the rim, bearing and spoke in cross-section and the roller bolt in elevation. Fig. 3 is a similar view to Fig. 1 showing a slight modification, and Fig. 4 like Fig. 2 shows the parts at right angles. Fig. 5 shows a device in which the lateral retaining means for the rim are modified. Fig. 6 shows in side elevation a different mode of securing the bearings on the spokes, links connecting the same and means to lock the roller bolts. Fig. 7 shows in end elevation partly in section and Fig. 8 in side elevation part of a wheel embodying the invention.

The rolls *d* securing the separation between the pneumatic tire rim *a* and the spokes *b*, are supported in suitable blocks *e* which are placed upon the spoke ends. As shown in Figs. 1 to 5 the blocks *e* are inserted by means of projections *c* into the hollow spoke ends, according to Figs. 6 to 8 the connection is effected by means of shoes placed on the bearing blocks *e*, in which shoes the ends of the spokes are inserted. In case of need the blocks, or also the spoke ends themselves, may be connected together by means of jointed rods *f*, in order to secure a greater stiffness of the wheel body.

Figure 8:
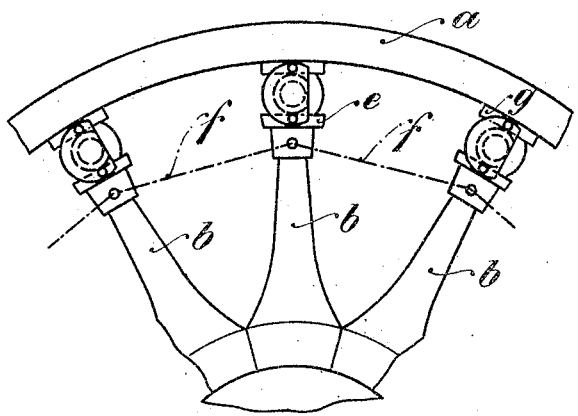

The rollers *d* shown in Figs. 1 to 6 are supported eccentrically, in order to secure as powerful a tension as possible upon the rim *a* in the working condition. In Figs. 7 and 8 this eccentricity of the bearing is dispensed with, which can be done without injury if the parts in contact with one another are carefully shaped. It is preferable, however, to form these rollers as shown in Figs. 7 and 8, namely, to provide them at the points of contact with the rim with a slight flattening so that on the turning of the rollers the rim will be powerfully stretched and in consequence of its elasticity will lie firmly compressed upon the flat parts in the working position.

For the prevention of a lateral displacement of the pneumatic tire rim, the rollers are provided with suitable eccentric projections either at the end of the rollers or in the middle of the same, which engage corresponding cavities of the rim or clamp projections of the same between them when in the working position. In Figs. 1, 2, 6 to 8, are indicated for this purpose the plates *g* upon the inner side of the rim, which serve as support for end projections or heads of the rollers, according to Figs. 3 to 5 there are cut in the rim itself cavities, into which corresponding eccentric projections, preferably in the middle of the rollers may enter.

In order to secure the roll against motion during the operation, various means may be applied. Thus, in addition to the above already mentioned flattening of the rolls, the eccentric part may be provided, as shown in Fig. 1, with a tangential projection *h*, which in consequence of the elasticity of the rim, prevents any undesired turning during use. Further, as shown in Fig. 6 (right side), the rollers can be prevented from participating in any undesired turning by means of suitable pins *i*. In Fig. 6 (left side) there is further shown in what manner the creeping of the pneumatic tire rim *a* over the spokes can be prevented, namely, by the arrangement that at one point the attached plates *g* of the upper rim are provided with projections *k* which engage over the bearing blocks of the rolls *d*.

In order to be able to remove the rim from the wheel body, the eccentric parts of the locking members which lie toward the outside of the wheel and project, are flattened at one point as shown in the drawing, so that turning the rolls from the working position by 180°, the rim without further operation can be withdrawn over the rolls in the axial direction. In this manner any exertion on the removal of the rim is completely avoided, because after turning the rolls there is provided already a sufficient space between the parts to be separated.

Having now particularly described and ascertained the nature of my said invention and in what manner the same is to be performed, I declare that what I claim is:

1. A rim for vehicle wheels, bearings engaging the spokes of the wheels and provided with openings, and a transverse locking member engaging said openings and provided with an eccentric part engaging the rim.

2. A rim for vehicle wheels, bearings engaging the spokes of the wheels, transverse locking members having eccentric parts for engaging the rim, means for preventing lateral movement of the rim on the bearings, and means for connecting said bearings.

In testimony whereof I have signed my name to this specification in the presence of two subscribing witnesses.

RUDOLF KRONENBERG.

Witnesses:
 WOLDEMAR HAUPT,
 ARTHUR SCHROEDER.